W. DUBILIER.
CONDENSER AND METHOD OF MAKING THE SAME.
APPLICATION FILED OCT. 30, 1918.
1,345,754. Patented July 6, 1920.
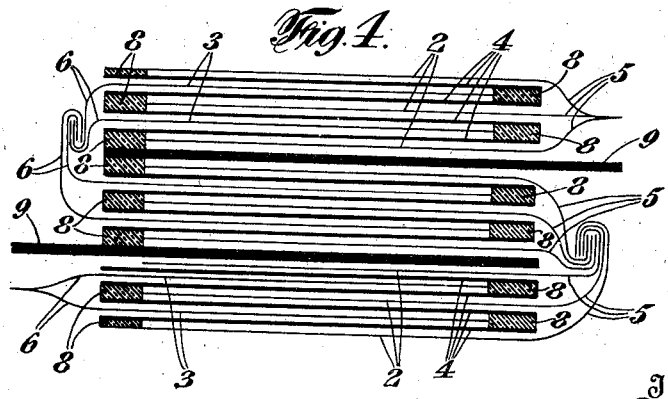

UNITED STATES PATENT OFFICE.

WILLIAM DUBILIER, OF NEW YORK, N. Y.

CONDENSER AND METHOD OF MAKING THE SAME.

1,345,754.  Specification of Letters Patent.  Patented July 6, 1920.

Application filed October 30, 1918. Serial No. 260,366.

*To all whom it may concern:*

Be it known that I, WILLIAM DUBILIER, of New York city, in the county of New York and in the State of New York, have invented a certain new and useful Improvement in Condensers and Methods of Making the Same, and do hereby declare that the following is a full, clear, and exact description thereof.

This invention has for an object to so construct electrical condensers that the conducting elements and intervening dielectric shall be so related to each other as to obtain high efficiency and uniformity of capacity.

Further objects and advantages of the invention will be in part obvious and in part specifically mentioned in the description hereinafter contained, in which a method of making condensers embodying the principle of the invention, is disclosed in connection with a condenser of well known form. It is to be understood, however, that the invention is applicable to other types of condensers than the one disclosed.

In the drawings—

Figure 1 is a side elevation of a condenser section made according to this invention.

Fig. 2 is an exaggerated sectional view showing a portion of the condenser made according to prior practice.

Fig. 3 is a view similar to Fig. 2, showing a portion of the condenser made according to this invention, and Fig. 4 is a side elevation showing a number of the condenser sections of the type illustrated in Fig. 1, assembled to make up a complete condenser.

In condensers made up of alternating layers of conducting elements or armatures, and insulation, such as mica or paper, the adjacent surfaces of the conducting elements and insulation heretofore have been separated at many points by minute spaces, owing to the fact that the surface of the insulation is not absolutely smooth. The surface of mica, for instance, is so uneven and hairy as to produce the above condition when used as a dielectric. If the condenser is charged with an alternating or varying current, the conducting elements tend to attract and repel each other on account of electrostatic effect. The minute spaces above mentioned then permit slight vibrations of the conducting elements to be set up, resulting in heat and other losses in the efficiency of the condenser.

Furthermore, in condensers which are impregnated with an insulating compound, for instance melted paraffin wax, the compound flows in between the conducting elements and the insulation, thus bringing about an uneven spacing at different portions of the condenser, and causing a loss in efficiency both on account of the greater thickness of the dielectric and the non-uniformity of dielectric path.

Figs. 1, 3 and 4 show a condenser of a well known type used in wireless apparatus, which is made in such a manner that the above difficulties are overcome. As shown in Fig. 1, a condenser section 1 is employed, consisting of a plurality of plates 2 and 3 of opposite polarity, which plates are separated by insulating sheets 4. The end edge portions 5 of the plates 2 project beyond one end of the insulating sheets 4, and the end portions 6 of the plates 3 project beyond the other end of the sheets 4, thus providing exposed portions on each of such sets of plates to afford contact surfaces for leading in the charging current. After the alternating layers of conducting plates and insulation have been assembled as shown in Fig. 1, the section 1, according to this invention, is subjected to tremendous pressure, the higher the better, so long as it is not so great as to press out the conducting plates in such a way as to decrease their thickness, as might happen if the pressure exceeded a value of say 30 tons per square inch. This pressure must be of such extreme and high value as to embed the conducting plates right into the surface of the dielectric, so as to effect intimate contact and absolute union of the adjacent surfaces of the conducting plates and insulating sheets. To facilitate these results, the conducting plates should be made of soft metal, which will accommodate itself more readily to the uneven surface of the dielectric, such as mica.

If the conducting plates and insulating sheets are subjected to the high pressure above described, the efficiency of the condenser will not be cut down owing to minute vibrations between its elements, the dielectric will be of uniform thickness, and will be entirely homogeneous throughout, with obvious beneficial effect upon the condenser. It is common practice to impregnate condensers of the type shown with an insulating compound such as paraffin wax, to bind together the different layers, and cover the exposed parts of the conducting elements so as to prevent brush discharge. If this step of impregnation be carried out according to prior practice, the condenser will have the structure shown in Fig. 2, in which the conducting plates 2$^a$ and 3$^a$ are separated by insulating sheets 4$^a$, and the wax has flowed between the insulating sheets and the conducting plates, to form the layers 7 therebetween, with a body of wax 8, sealing each inner edge of a conducting plate. As the pressures heretofore employed upon condensers have not been sufficient to prevent the occurrence of the small spaces between the conducting plates and the dielectric, the layers of wax 7 will be of appreciable thickness, and will cut down the efficiency of the condenser both by bringing about a greater and uneven length of dielectric path, and by interposing a foreign substance between the plates and the dielectric. Vibrations of the nature above described will also occur in such condensers.

Furthermore if the impregnating compound flows into the above mentioned small spaces between the conducting plates and dielectric, the heating up of the condenser during use will cause the insulating compound to soften and loosen up, whereby mechanical vibrations of the nature previously described will be set up, with consequent rapid deterioration of the condenser.

If it is desired to impregnate condenser sections of the type shown in Fig. 1, with insulating compound, a plurality of such sections may be conveniently placed within a clamp, with suitable spacing members interposed to prevent the different sections from sticking together, and the clamp tightened up to hold the elements of the sections in relation to each other. The sections are then placed within a receptacle containing molten insulating composition, and are allowed to remain therein for a sufficient time to allow the insulating compound to permeate thoroughly the interiors of the sections. The impregnation may also be carried on in a vacuum by exhausting the air from the receptacle, thus aiding in the expulsion of air from the interiors of the sections. The sections are then removed from the insulating bath and subjected to the tremendous pressure before described, with the result that the insulating compound is squeezed out from between the conducting plates and insulating sheets to such an extent that no appreciable amount is left between adjacent surfaces thereof. In actual practice, it has been found that, if any of the wax is left, it cannot be seen with the eye nor scraped off by means of a knife in visible quantities.

A condenser then results of the character shown in Fig. 3 in which the plates 2 and 3 have been forced into intimate contact and absolute union with the adjacent surfaces of the insulating sheets 4, the wax being present only in a body 8 sealing the inner edges of the plates 2 and 3 to prevent brush discharge. The sections preferably are allowed to cool while under this high pressure in order to insure that the favorable conditions established, will be permanent.

In some instances a plurality of condenser sections 1, are built up to form complete condensers such as shown in Fig. 4, by placing layers of insulation 9 between adjacent sections, such layers preferably projecting alternately beyond opposite ends of the sections so that the end portions 5 and 6 can be readily connected together. Such connection is most advantageously made by soldering the end portions 5 and 6 to each other so as to afford a connection of low electrical resistance.

The assembled sections are then placed within a suitable clamp, and again subjected to an impregnating insulating bath similar to the one above described, so as to fill all vacant spaces within the condenser and to bind it together into a unit. The complete condenser is then again subjected to the tremendous pressure which previously had been applied to the individual sections after being impregnated, and allowed to cool under such high pressure. The condenser is then a solid unit bound together by the insulation which has covered the edges of the conducting plates in such a way as to prevent brush discharge.

Due to the heat of soldering the end portions 5 and 6, or on account of other handling of the condenser sections, it often happens that the intimate union between the plates and insulating sheets is broken at some points before the complete condenser is assembled. By again applying exceedingly high pressure to the complete unit, it is insured that any portions of the condenser which may have become loosened, will again be forced into absolute contact with each other. Thus the complete condenser will not possess any spaces permitting vibrations to be set up, the thickness of the dielectric will be uniform, and the dielectric will consist wholly of the mica or paper, without the interposition of any foreign substance between it and the conducting plates.

While a specific procedure has been described, it will be obvious that many changes may be made without departing from the principle of the invention, as described in the following claims.

I claim:—

1. The method of making condensers which comprises assembling alternate layers of conducting elements and mica sheets and subjecting the same to such high pressure as to effect intimate contact and practically absolute and complete surface union of such elements and mica sheets.

2. The method of making condensers which comprises assembling alternate layers of conducting elements and sheet insulation, impregnating the same with an insulating composition, and subjecting the same to such high pressure as to exclude substantially all the composition from between juxtaposed elements and insulation, and effect intimate contact and practically absolute and complete surface union of such elements and insulation.

3. The method of making condensers which comprises assembling alternate layers of conducting elements and sheet insulation, impregnating the same with a liquid insulating composition in a vacuum, and subjecting the same to such high pressure as to exclude substantially all the composition from between juxtaposed elements and insulation, and effect intimate contact and practically absolute and complete surface union of such elements and insulation.

4. The method of making condensers which comprises assembling alternate layers of soft metal plates and mica sheets, and subjecting the same to such high pressure as to effect intimate contact and practically absolute and complete surface union of such plates and sheets.

5. The method of making condensers which comprises assembling alternate layers of soft metal plates and mica sheets, impregnating the same with a liquid insulating composition, and subjecting the same to such high pressure as to exclude substantially all the composition from between juxtaposed plates and sheets, and effect intimate contact and practically absolute and complete surface union of such plates and sheets.

6. The method of making condensers which comprises assembling alternate layers of conducting elements and sheet insulation, impregnating the same with a molten insulating composition, and subjecting the same, while cooling, to such high pressure as to exclude substantially all the composition from between juxtaposed elements and insulation, and effect intimate contact and practically absolute and complete surface union of such elements and insulation.

7. The method of making condensers which comprises assembling alternate layers of soft metal plates and mica sheets, impregnating the same with a molten insulating composition, and subjecting the same, while cooling, to such high pressure as to expel substantially all the composition from between juxtaposed plates and sheets, and effect intimate contact and practically absolute and complete surface union of such plates and sheets.

8. The method of making condensers which comprises assembling a plurality of condenser sections each comprising alternate layers of conducting plates and insulating sheets, subjecting such sections to such high pressure as to effect intimate contact and absolute union of the adjacent surfaces of such plates and sheets, connecting together the several sections to form a unit, and subjecting the unit to a similar high pressure.

9. The method of making condensers which comprises assembling a plurality of condenser sections each comprising alternate layers of conducting plates and insulating sheets, subjecting such sections to such high pressure as to effect intimate contact and absolute union of the adjacent surfaces of such plates and sheets, connecting together the several sections to form a complete condenser, impregnating the complete condenser with an insulating compound, and subjecting such condenser to a similar high pressure.

10. The method of making condensers which comprises assembling a plurality of condenser sections each comprising alternate layers of conducting plates and insulating sheets, connecting together the several sections to form a complete condenser, and subjecting such condenser to such high pressure as to effect intimate contact and absolute union of the adjacent surfaces of such plates and sheets.

11. The method of making condensers which comprises assembling a plurality of condenser sections each comprising alternate layers of conducting plates and insulating sheets, connecting together the several sections to form a complete condenser, impregnating the complete condenser with a molten insulating compound, and subjecting the same to such high pressure as to effect intimate contact and absolute union of the adjacent surfaces of such plates and sheets.

12. The method of making condensers which comprises assembling a plurality of condenser sections each comprising alternate layers of conducting plates and insulating sheets, connecting together the several sections to form a complete condenser, impregnating such condenser with a molten insulating compound, and permitting the same to cool while subjected to such high pressure as to effect intimate contact and absolute union of the adjacent surfaces of such plates and sheets.

13. The method of making condensers which comprises assembling a plurality of condenser sections each comprising alternate layers of conducting plates and insulating sheets, impregnating such sections with a molten insulating compound, subjecting the same to such high pressure as to effect intimate contact and absolute union of the adjacent surfaces of such plates and sheets, connecting together the several sections to form a complete condenser, and subjecting such condenser to a similar high pressure.

14. The method of making condensers which comprises assembling a plurality of condenser sections each comprising alternate layers of conducting plates and insulating sheets, impregnating such sections with a molten insulating compound, subjecting the same to such high pressure as to effect intimate contact and absolute union of the adjacent surfaces of such plates and sheets, connecting together the several sections to form a complete condenser, impregnating the complete condenser with a molten insulating compound, and subjecting the same to a similar high pressure.

15. A condenser comprising alternate layers of conducting elements and insulating sheet material, the juxtaposed conducting elements and insulating sheets being in intimate contact and in absolute surface union with each other substantially throughout, whereby voids within the condenser are substantially eliminated.

16. A condenser comprising alternate layers of metal foil and mica sheets, the adjacent layers of foil and mica being in intimate contact and in absolute surface union with each other substantially throughout, whereby voids within the condenser are substantially eliminated.

17. A condenser comprising alternate layers of conducting elements and insulating sheet material, an insulating composition surrounding the edges of the layers, the juxtaposed conducting elements and insulating sheets being in intimate contact and in absolute surface union with each other substantially throughout, whereby said insulating composition is substantially excluded from the active surfaces of the condenser, and voids within the condenser are substantially eliminated.

18. A condenser comprising alternate layers of metal foil and mica sheets, and insulating composition surrounding the edges of the layers, the adjacent layers of foil and mica being in intimate contact and in absolute surface union with each other substantially throughout, whereby said insulating composition is substantially excluded from the active surfaces of the condenser, and voids within the condenser are substantially eliminated.

In testimony that I claim the foregoing I have hereunto set my hand.

WILLIAM DUBILIER.